US005597393A

United States Patent [19]

Johnson et al.

[11] Patent Number: 5,597,393

[45] Date of Patent: Jan. 28, 1997

[54] DISPLACEABLE FILTERING APPARATUS FOR AIRBORNE CONTAMINATES

[75] Inventors: Randall F. Johnson, Franklin; Christopher G. Stewart, Oil City, both of Pa.

[73] Assignee: Joy MM Delaware Inc.

[21] Appl. No.: 271,147

[22] Filed: Jul. 6, 1994

[51] Int. Cl.$^{6}$ .......... B01D 46/00

[52] U.S. Cl. .......... 55/356; 55/385.5; 55/422; 55/467; 55/478; 55/503

[58] Field of Search .......... 55/356, 385.3, 55/385.5, 422, 467, 478, 481, 503; 95/273

[56] References Cited

U.S. PATENT DOCUMENTS

| | | | |
|---|---|---|---|
| 2,375,689 | 5/1945 | Reeder . | |
| 2,486,472 | 11/1949 | Harris | 55/422 |
| 3,005,627 | 10/1961 | Tinlin . | |
| 3,387,889 | 6/1968 | Ziemba et al. | 299/12 |
| 3,712,678 | 1/1973 | Amoroso | 299/68 |
| 3,743,356 | 7/1973 | Sheets | 299/18 |
| 4,144,043 | 3/1979 | Johnston | 55/385.5 |
| 4,249,778 | 2/1981 | McGuire | 55/385.5 |
| 4,289,509 | 9/1981 | Holter | 55/385.5 |
| 4,323,377 | 4/1982 | Jolin | 55/341 |
| 4,336,041 | 6/1982 | Jolin | 55/341 R |
| 4,380,353 | 4/1983 | Campbell et al. | 299/12 |
| 4,550,952 | 11/1985 | Hall | 299/64 |
| 5,062,868 | 11/1991 | Kennedy | 55/356 |
| 5,141,528 | 8/1992 | Boczkiewicz et al. | 55/356 |
| 5,142,732 | 9/1992 | Davis | 55/356 |

*Primary Examiner*—C. Scott Bushey
*Attorney, Agent, or Firm*—Kirkpatrick & Lockhart LLP

[57] ABSTRACT

An apparatus for filtering airborne contaminates that has a frame member and a collection duct attached thereto. A discharge duct assembly is pivotally connected to the frame member and is pivotable between a first position wherein it can be removably connected to the collection duct to form a duct assembly and a second position displaced from the frame member. A fan is attached to the discharge duct assembly for travel therewith and is adapted to cause contaminate-laden air to be drawn into the duct assembly and pass through a filter mounted therein. A cylinder is provided for selectively pivoting the discharge duct assembly between the first and second positions.

33 Claims, 8 Drawing Sheets

32 A 35 39 43 106 10 40 72 72 70 30 38 42 46 49 20 104 36 102 15 100 59 74 12 14 16 19

DISPLACEABLE FILTERING APPARATUS FOR AIRBORNE CONTAMINATES

BACKGROUND OF THE INVENTION

1. Field of the Invention

The present invention relates to dust filtering and collection apparatus and, more particularly, is directed to dust collection apparatus for collecting and filtering dust created by a mining machine.

2. Description of the Invention Background

Over the years, many different methods and apparatuses have been developed to extract coal and other valuable materials from beneath the earth's surface. Today, a variety of automated equipment exists for mining such materials at great subterranean depths.

One type of coal mining apparatus comprises a mobile mining machine that has a rotatable cutting or mining head that is equipped with a plurality of cutting bits adapted to dislodge the coal from the seam. The cutting head is typically attached to a movable boom arrangement that enables the position of the cutting head to be adjusted relative to the mine floor. As the cutting head is rotated and advanced into the seam, the coal is dislodged from the mine face and is received on gathering and conveying apparatuses mounted to the mining machine. The conveying apparatus discharges the mined coal onto separate freestanding or mobile conveying apparatus for eventual transfer out of the mine.

As the cutting bits engage the coal, fine particles of dust are created which, if not controlled, tend to permeate the air around the mining machine. Many methods and apparatuses have been developed in an effort to control the proliferation of such dust throughout the mine. For example, temporary barriers are typically used to direct fresh air across the mine face and into an exit duct arrangement wherein the dust laden air can be filtered. In addition, various mining machine-mounted filter/duct arrangements have also been used to filter dust laden air at the mine face.

For example, U.S. Pat. No. 3,387,889 to Ziemba et al. discloses a coal dust removal and conveyance system for use in connection with a continuous mining machine that comprises a duct-like air flow chamber that is attached to the mining machine boom for travel therewith. The air flow chamber has openings therein that are adjacent to the mining machine's cutter heads to permit dust laden air to be drawn into the air flow chamber. The rear portion of the air flow chamber is attached to a filter tank by a flexible coupling member which allows the air flow member to pivotally travel with the boom. A blower is operably coupled to the filter tank for drawing the dust laden air into the air flow chamber and through the filter tank. The blower is rigidly attached to the mining machine, while the filter member can be pivotally supported on the mining machine to enable it to be selectively tilted toward and away from the blower.

Another mine dust collection apparatus for use in connection with a continuous miner is disclosed in U.S. Pat. No. 3,712,678 to Amoroso. This apparatus has a first duct housing that is mounted to the mining machine boom for travel therewith. A second duct housing is rigidly mounted to the mining machine's chassis. A third connecting duct housing overlies the adjacent ends of the first and second ducts. The connecting duct housing is pivotally mounted to the second duct housing to permit the first duct housing to pivot with the boom.

U.S. Pat. No. 3,743,356 to Sheets discloses a coal dust removal system for use with a mining machine that comprises a forward hood member that is pivotally attached to an enclosure hood that houses a filter chamber and a fan chamber. The forward hood member is pivotally attached to the enclosure hood such that it can pivotally travel with the boom of the mining machine. The enclosure hood is fixed to the main frame member of the mining machine.

The above-discussed duct arrangements and others like them comprise heavy, rigid structures that are fitted onto the mining machine to clean contaminates at the mine face. Because such ductwork is typically attached to the top of the mining machine and generally extends the entire length thereof, access to the mining machine components located under such ductwork is limited. Thus, typical ductwork arrangements often must be completely removed from the mining machine by auxiliary equipment to enable one to gain access to the components located thereunder. Such removal processes are difficult to perform in the confines of the mine and are usually very time consuming. Many unproductive hours can be wasted in the process of removing the ductwork to gain access to an otherwise readily repairable hose leak located under the ductwork.

Accordingly, there is a need for a ductwork system for use in connection with a mining machine that can remove airborne contaminates from the mine face and can be easily maneuvered and manipulated to provide quick access to the various components of the mining machine or other vehicle to which it is attached.

SUMMARY OF THE INVENTION

In accordance with a particular preferred form of the present invention, there is provided apparatus for collecting airborne contaminates that comprises a collection duct attached to a support frame. An elongated discharge duct assembly is pivotally attached to the support frame and is selectively pivotable about an axis parallel to its longitudinal axis between a first position wherein the discharge duct assembly is attachable to the collection duct to create a continuous duct assembly and a second position wherein the discharge duct is displaced from the support frame. Filtering apparatus is operatively attached to the continuous duct assembly for filtering airborne contaminates passing therethrough. Air flow inducing apparatus for inducing contaminate-laden air to be drawn into the continuous duct assembly and pass therethrough communicates within the continuous duct assembly.

In another preferred embodiment, the apparatus is adapted to collect airborne contaminants generated by a mining head of a mining machine. The apparatus comprises a collection duct that is attached to the mining machine adjacent the mining head. An elongated discharge duct is pivotally attached to the mining machine and is selectively pivotable about an axis parallel to its longitudinal axis between a first position wherein the discharge duct is attachable to the collection duct to create a continuous duct assembly and a second position wherein the discharge duct is displaced from the mining machine. Filtering apparatus is operatively attached to the continuous duct assembly for filtering airborne contaminants passing therethrough. Air flow inducing apparatus for inducing contaminate-laden air to be drawn into the continuous duct assembly and pass therethrough communicates with the continuous duct assembly.

In yet another preferred embodiment, the apparatus comprises a collection duct attached to the mining machine adjacent the mining head. A discharge duct is also attached to the mining machine. An intermediate duct is pivotally attached to the mining machine such that it can be selectively pivoted between a first position wherein it can be serially attached to the collection duct and discharge duct and a second position wherein it is displaced from the mining machine for maintenance purposes. Air flow inducing means communicates with the continuous duct assembly to cause the contaminate-laden air to enter the continuous duct assembly and pass therethrough. Filtering apparatus is operatively attached to the continuous duct assembly for filtering the contaminate-laden air drawn into the continuous duct assembly.

In still another preferred embodiment, the apparatus comprises a first collection duct mounted to the mining machine adjacent the mining head. A first discharge duct is attached to the mining machine such that it can discharge air adjacent the first lateral side of the mining machine. A first intermediate duct is pivotally attached to the mining machine such that it is selectively pivotable between a first position wherein it is interposed between the collection duct and the first discharge duct such that the first intermediate duct can be serially interconnected to the collection duct and the first discharge duct to create a first continuous duct assembly on the first lateral side of the mining machine and a second position wherein the first intermediate duct is displaced from the frame of the mining machine. A first air flow inducing apparatus communicates with the first continuous duct assembly to cause contaminate-laden air to pass therethrough. A first filter is operably attached to the first continuous duct assembly for filtering the contaminate-laden air drawn into the first continuous duct assembly. A second discharge duct is attached to the mining machine and is arranged for discharge adjacent the second lateral side of the mining machine. A second intermediate duct is pivotally attached to the mining machine such that it is selectively pivotable between a primary position wherein it is interposed between the collection duct and the second discharge duct such that the second intermediate duct can be serially interconnected to the collection duct and the second discharge duct to create a second continuous duct assembly on the second lateral side of the mining machine and a secondary position wherein the second intermediate duct is displaced from the frame of the mining machine. A second air flow inducing apparatus communicates with the second continuous duct assembly to cause contaminate-laden air to pass therethrough. A second filter is operably attached to the second continuous duct assembly for filtering the contaminate laden air drawn therein.

It is an object of the present invention to provide a displaceable apparatus for filtering airborne contaminants that can be selectively displaced between a first filtering position and a second maintenance position adjacent to the structure to which it is attached.

It is an object of the present invention to provide a duct assembly for use in connection with a mobile vehicle such as a mining machine which can remove airborne contaminates and can be easily maneuvered relative to the mining machine to provide access to the components thereof.

Accordingly, the present invention provides solutions to the aforementioned problems commonly encountered with dust filtering apparatus used in connection with mining machines. The reader will appreciate that these and other details, objects and advantages will become apparent as the following detailed description of the present preferred embodiment thereof proceeds.

BRIEF DESCRIPTION OF THE DRAWINGS

In the accompanying drawings, there is shown a present preferred embodiment of the invention wherein like reference numerals are employed to designate like parts and wherein.

DETAILED DESCRIPTION OF THE PREFERRED EMBODIMENTS

Figure 1:
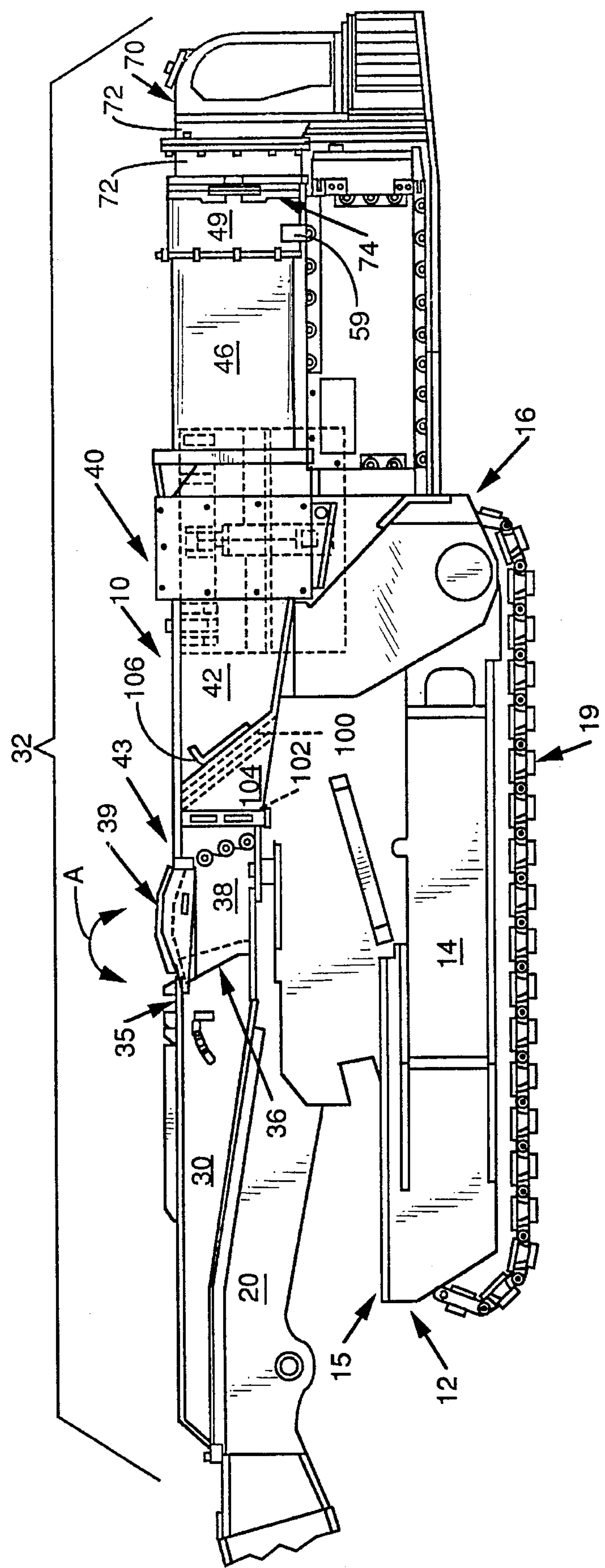
FIG. 1 is a side elevational view of the displaceable filtering apparatus of the present invention attached to a mining machine.

Referring now to the drawings for the purposes of illustrating the present preferred embodiment of the invention only and not for purposes of limiting the same, the Figures show displaceable filtering apparatus for collecting airborne contaminates generally designated as 10. The various embodiments of the subject invention described herein are particularly well adapted for use in connection with a mobile mining machine for collecting airborne dust particles generated thereby during the mining of coal and similar materials. However, the reader will readily appreciate that the subject invention could also be successfully used in connection with a variety of other vehicles/apparatuses wherein access to components typically located under filtering/collection apparatus may be required from time to time. Thus, while the subject invention is herein described in connection with a mobile mining machine, the scope of protection afforded to the subject invention should not be limited solely to that application.

More particularly and with reference to FIG. 1, there is shown a collection apparatus 10 operably attached to a mining machine 12. The mining machine 12 comprises a frame member 14 that has a front portion 15, a rear portion 16, a right lateral side 17 and a left lateral side 18. A pair of endless driven tracks 19 are operably attached to the mining machine 12 for propelling the mining machine 12 along the mine surface. A movable boom member 20 is pivotally attached to the frame member 14 and is selectively pivotable by hydraulically powered cylinders (not shown). The boom member 20 operably supports a rotatable mining head (not shown) that is equipped with mining bits adapted to dislodge material from the seam. As the mining bits engage the material to be mined, dust is typically generated in the vicinity of the mining head.

In a preferred form, the collection apparatus 10 of the present invention comprises a collection duct 30, an intermediate duct assembly 40 and a discharge duct 70, all adapted to be serially interconnected to form a continuous duct assembly generally designated as 32. Preferably, ducts 30, 40, and 70 are fabricated from steel or sheet metal material using known fabricating methods. However, other materials could be successfully used. In the embodiment depicted in FIGS. 1–3, an apparatus constructed according to the teachings of the present invention is mounted to each lateral side of the mining machine frame 14. The components comprising the apparatus mounted to the right lateral side 17 of the mining machine frame 14 are designated by"'". The reader will appreciate, however, that the construction apparatuses (10, 10') are mirror images of one another and their operation is identical.

Figure 2:
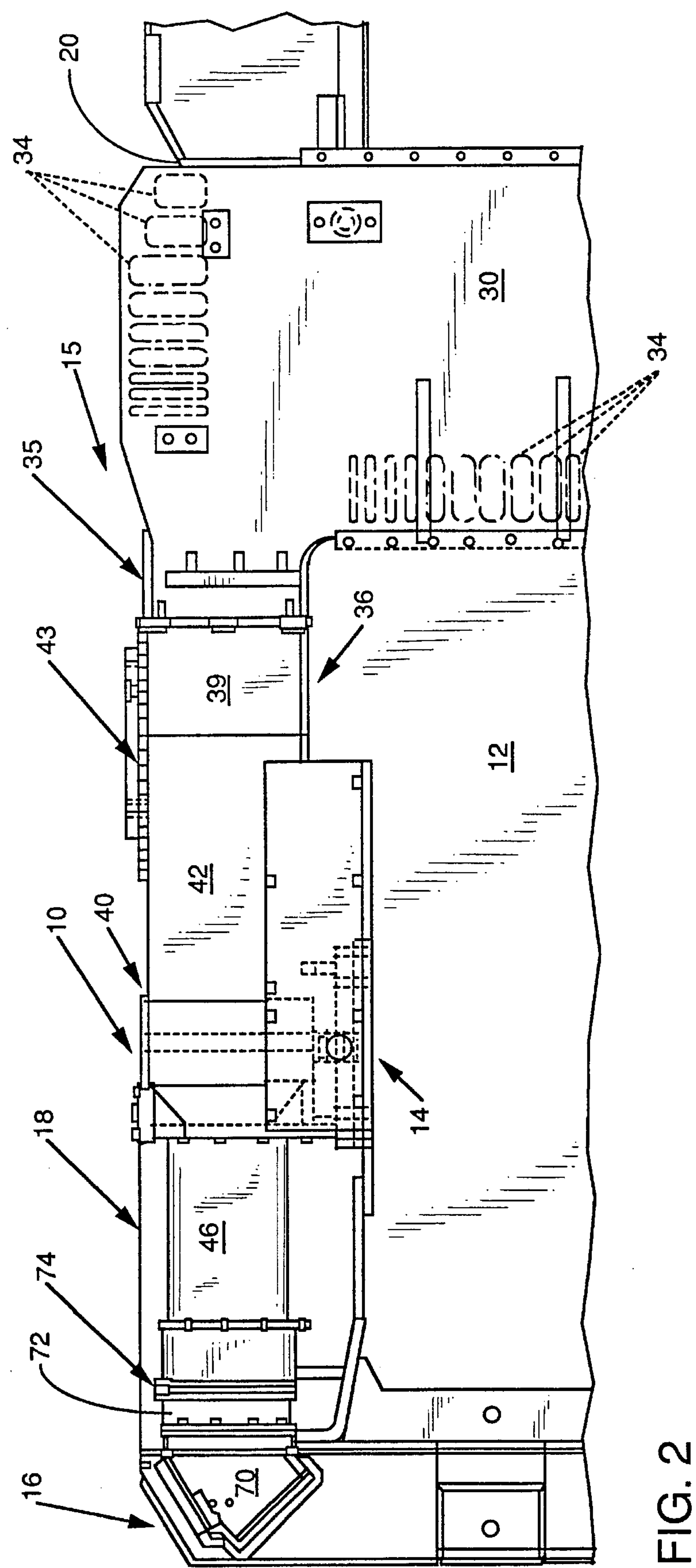
FIG. 2 is a plan view of one half of the displaceable filtering apparatus of the present invention attached to a mining machine, the other side being the mirror image thereof.
Figure 3:
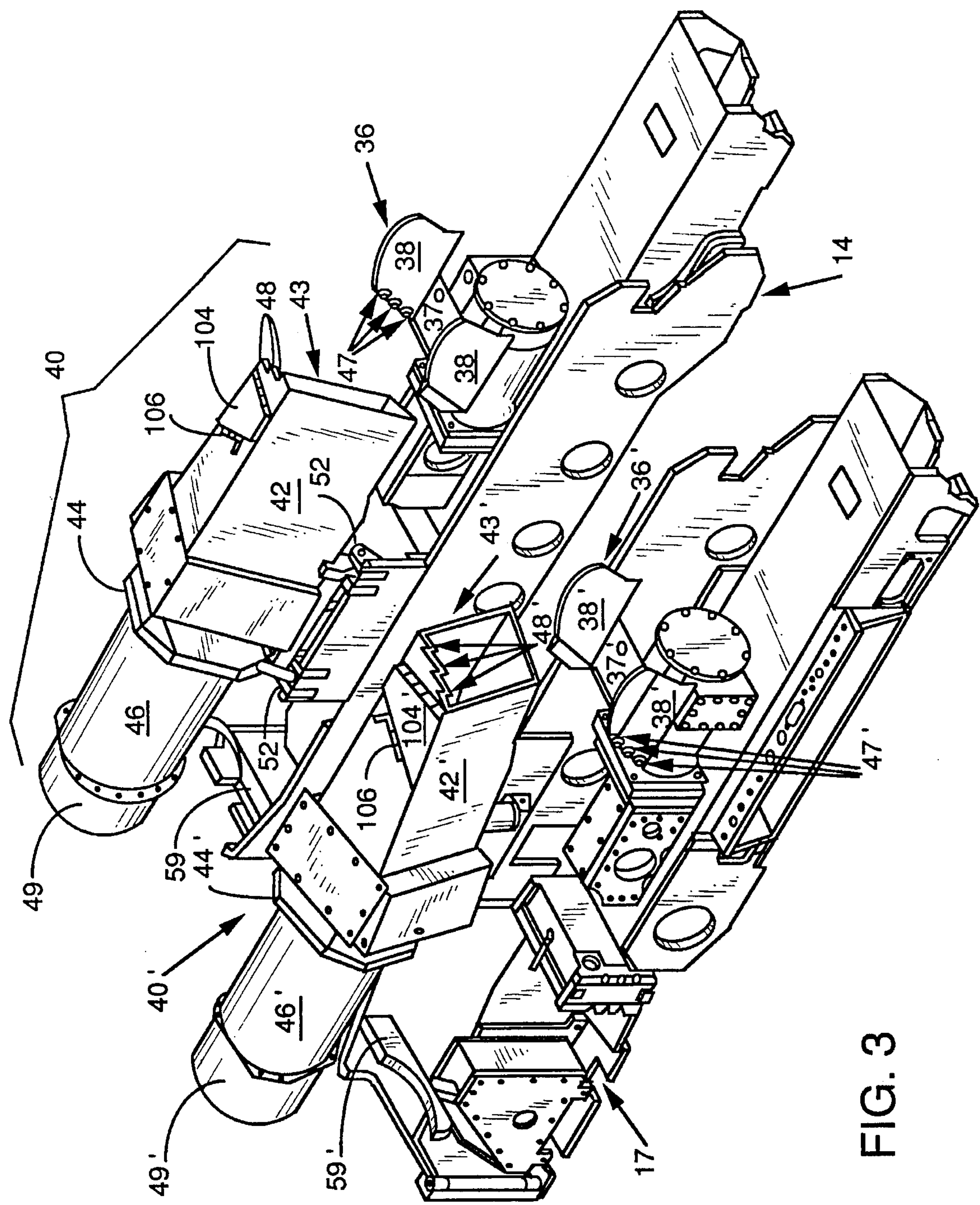
FIG. 3 is a perspective view of the displaceable filtering apparatus of the present invention attached to the frame of a mining machine with some of the mining machine components removed for clarity.

As can be seen in FIGS. 1 and 2, the collection duct 30 is preferably bolted to the boom 20 for travel therewith and is provided with a plurality of openings 34 in the underside thereof to permit contaminate-laden (i.e., dust-laden) air to be drawn therein. The skilled artisan will appreciate, however, that openings 34 may be provided in various shapes and sizes and may be advantageously located anywhere in the collection duct 30 to maximize intake of contaminate-laden air. Preferably, collection duct 30 has discharge portions (35, 35') that are each pivotally received within a corresponding connection member (36, 36') that is rigidly attached to the frame 14 of the mining machine 12. As can be seen in FIG. 3, each connection member (36, 36') preferably comprises a bottom portion (37, 37') that are each attached to the frame 14 and has two upwardly extending, spaced-apart side walls (38, 38') attached thereto which serve to define a space sized to receive the corresponding discharge portion (35, 35') of the collection duct 30 therein. A cover plate (39, 39') is pivotally attached to the corresponding discharge portion (35, 35') of the collection duct 30 for pivotal travel as indicated by arrow "A" and is a sized to overlay the corresponding open-topped connection member (36, 36') in a manner that will discussed in further detail below.

Preferably, each intermediate duct assembly (40, 40') comprises an elongated forward duct (42, 42') that has a front portion (43, 43') and a rear connection flange (44, 44'). An exhaust fan (46, 46') is bolted to the corresponding connection flange (44, 44') attached to the elongated forward duct (42, 42'). In a preferred embodiment, exhaust fans manufactured by Joy Green Fan, a Division of Joy Technologies, Inc. of New Philadelphia, Ohio under Model No. 00500792-0804 are used; however, other appropriately sized exhaust fans (46, 46') can also be used. It will be appreciated that the exhaust fan (46, 46') is powered by the mining machine 12 in a known manner and serves to induce contaminate-laden air to be drawn into the collection duct 30 through openings 34 and flow through the continuous duct assembly (32, 32'). Preferably, apparatuses (10, 10') are independently operated depending upon which side of the mining machine 12 the filtered air is to be discharged. For example, if it is desired to discharge the filtered air along the left lateral side/rear of the mining machine 12, then apparatus 10 would be operated. That is, fan 46 would be energized. Fan 46' would remain de-energized. If, on the other hand, it is desired to discharge filtered air along the right lateral side/rear of the mining machine 12, then fan 46' would be energized. In addition, the reader will appreciate that both fans (46, 46') could be simultaneously energized to discharge filtered air adjacent both lateral sides of the mining machine if so desired.

It has been discovered that, due to the physical size of the exhaust fans (46, 46') that are preferably used in this particular filtering application, it is advantageous to connect exhaust fans (46, 46') to their corresponding elongated forward ducts (42, 42') to enable them to be pivotally displaced in a manner discussed below to positions adjacent to or removed from the mining machine 12 to provide access thereto. However, it will be appreciated that, because the physical size, shape and numbers of exhaust fans (46, 46') or other means for inducing airflow will vary depending upon the particular filtering application, the exhaust fans (46, 46') could be advantageously mounted in a variety of locations wherein contaminate-laden air is caused to flow through the corresponding continuous duct assemblies (32, 32'). Accordingly, the scope of protection afforded to the subject invention should not be limited to embodiments wherein a single exhaust fan (46, 46') is attached to or comprises a portion of the movable intermediate duct assembly (40, 40').

In a preferred embodiment, the front portion (43, 43') of the elongated forward duct (42, 42') is preferably configured as shown in FIGS. 1 and 3 and preferably has three bolt cradles 48 provided therein. The bolt cradles (48, 48') are arranged to align with corresponding bolts (47, 47') provided in connection member (36, 36'). Therefore, when the intermediate duct assembly (40, 40') is pivoted to the first position wherein it forms the continuous duct assembly (32, 32') with the collection duct 30 and the discharge duct (70, 70') (see FIG. 1), the bolt cradles (48, 48') will be received on the corresponding bolts (47, 47'). By tightening nuts on the bolts (47, 47'), the intermediate duct assembly (40, 40') is attached to the connection member (36, 36'). The upper cover plate (39, 39') is then pivoted to the closed position (see FIG. 1) such that it overlays the open-topped connection member (36, 36') and the front portion (43, 43') of the elongated forward duct (42, 42') to create a transition between the discharge portion (35, 35') of the collection duct 30 and the connection member (36, 36').

Figure 4:
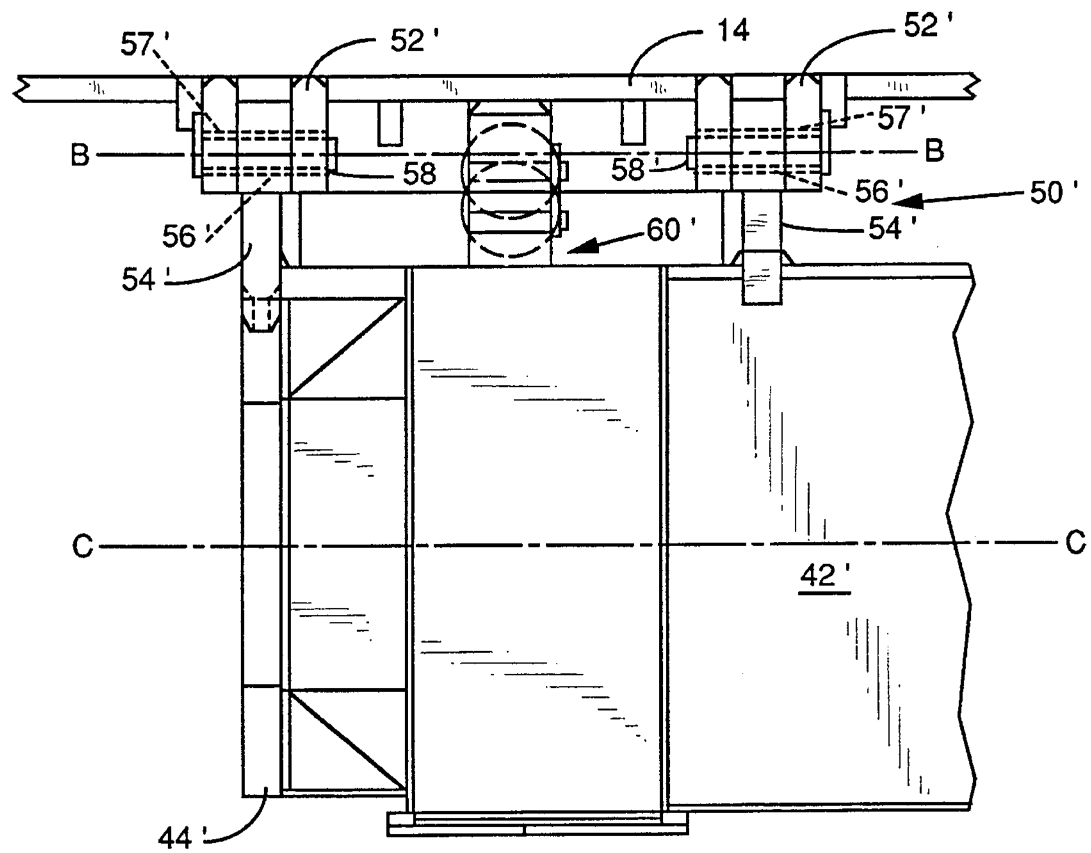
FIG. 4 is a partial plan view of a preferred hinge/cylinder arrangement for pivotally attaching a preferred intermediate duct assembly to the frame of a mining machine.
Figure 5:
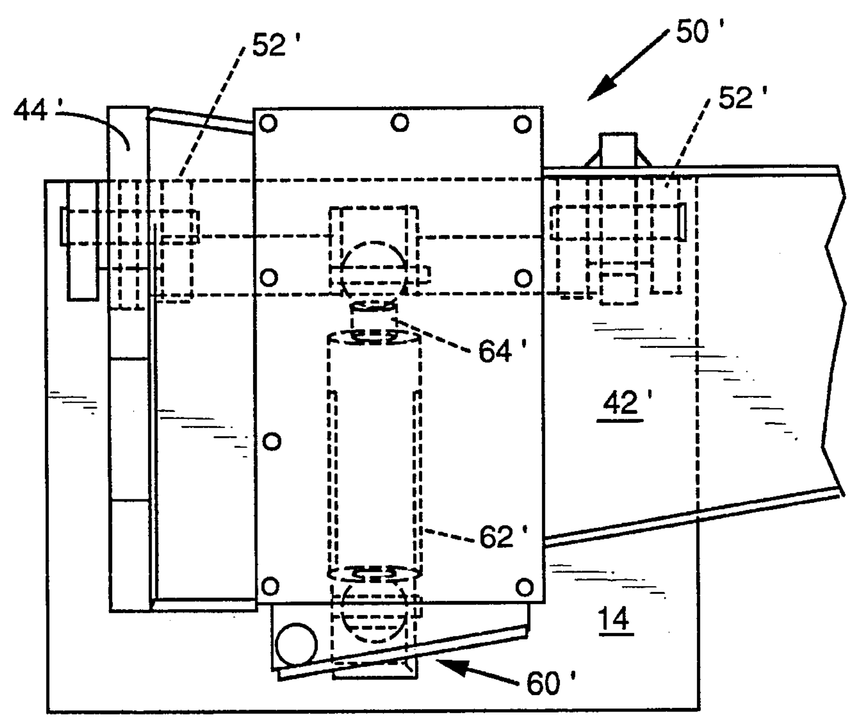
FIG. 5 is a partial side elevational view of the hinge/cylinder arrangement of FIG. 4.

As can be seen in FIGS. 3–5, an elongated forward duct 42' is pivotally attached to frame member 14 by a hinge assembly, generally designated as 50', with corresponding structure being provided on the opposite side of the mining machine 12. Hinge assembly 50' preferably comprises two, spaced-apart clevis members 52' that are adapted to receive corresponding outwardly extending hinge members 54' that are attached to the elongated forward duct 42' and flange 44' preferably by welding. Each hinge member 54' has a bore 56' therethrough that is adapted to be coaxially aligned with bores 57' in the corresponding clevis members 52'. Hinge members 54' are rotatably pinned to the clevis members 52' in a known manner by pins 58' such that the intermediate duct assembly 40' can pivot around axis B—B as defined by the clevises 52', which is parallel to the longitudinal axis C—C of the elongated duct 42'. See FIG. 4. The reader will appreciate that the apparatus 10 is pivotally attached to frame 14 in a similar manner.

Figure 6:
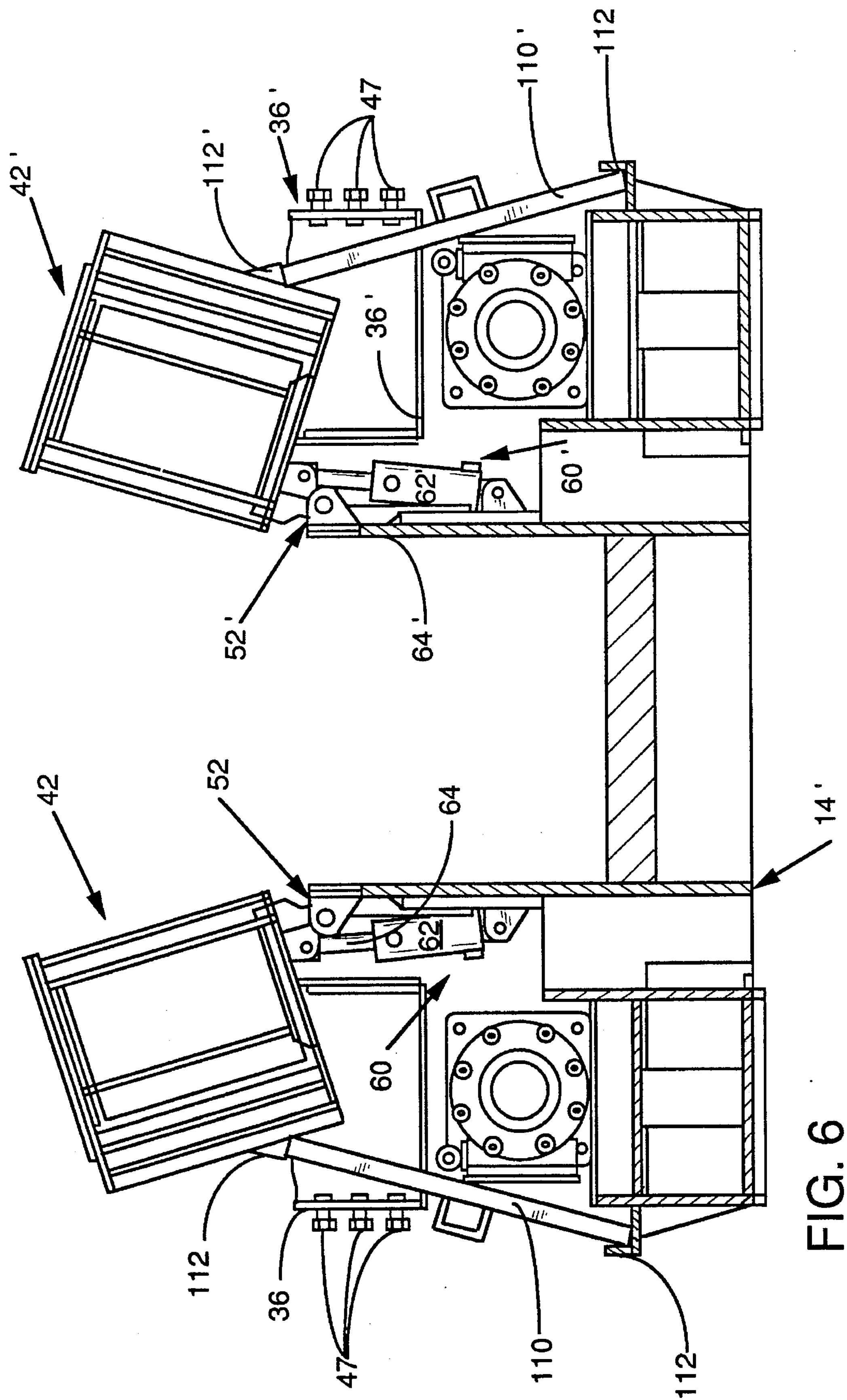
FIG. 6 is a partial rear elevational view of the displaceable filtering apparatus of the present invention attached to the frame of a mining machine with some of the mining machine components omitted for clarity.

In a preferred embodiment, a cylinder assembly (60, 60') with an integral load holding pilot check valve is used to selectively pivot each intermediate duct assembly (40, 40') between its first position (FIG. 1) wherein the intermediate duct assembly (40, 40') can be interconnected with the collection duct 30 and the discharge duct (70, 70') and a second position (FIGS. 3 and 6) wherein the intermediate duct assembly (40, 40') is raised above or is displaced from the frame 14 to thereby provide access to the various mining machine components located thereunder. The cylinder assembly (60, 60') preferably comprises a hydraulically powered cylinder (62, 62') that is pinned to the frame 14 and has a selectively extendable piston (64, 64') that is pinned to the elongated forward duct (42, 42') as shown in FIGS. 5 and 6.

Figure 7:
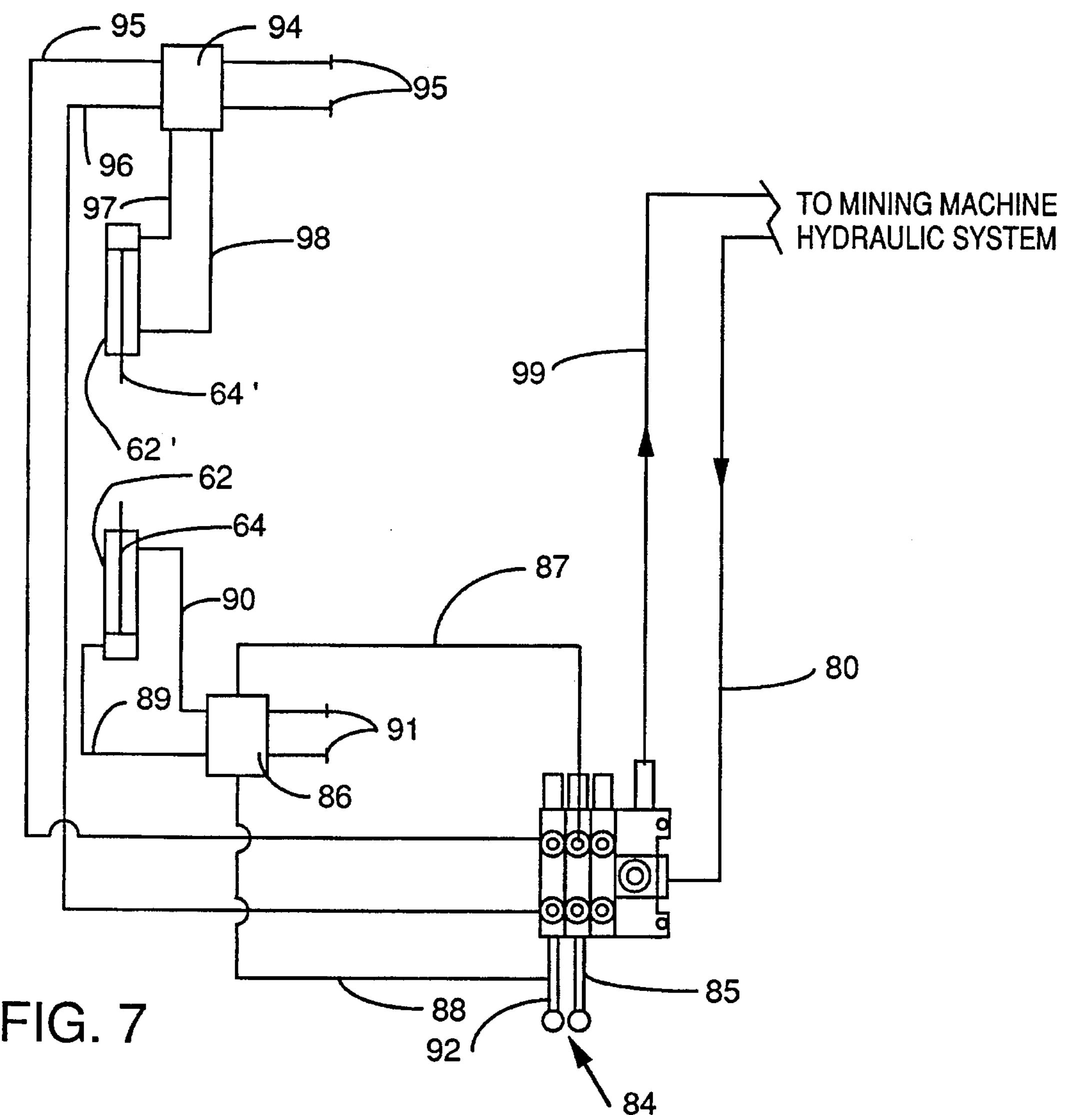
FIG. 7 is a schematic of a preferred hydraulic system arrangement for controlling the displaceable filtering apparatus of the present invention.
Figure 8:
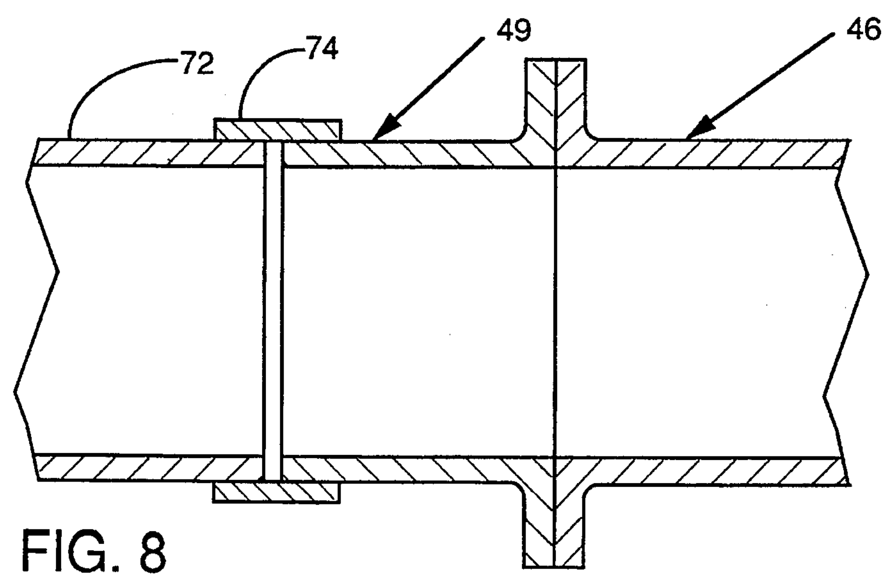
FIG. 8 is a partial cross-sectional assembly view of a preferred clamping arrangement between a fan housing and a discharge duct of the present invention.

FIG. 7 is a schematic of a preferred hydraulic system for controlling the left hydraulic cylinder 62 and the right hydraulic cylinder 62'. As can be seen in FIG. 7, a supply line 80 is attached to the mining machine's hydraulic supply tank and pumping system (not shown). The supply line 80 supplies hydraulic fluid under pressure to valve assembly 84. Valve assembly 84 comprises a commercially available diverter valve and includes manually operable valve 85 that is attached to a pilot check valve 86 by lines 87 and 88. Pilot check valve 86 is attached to the cylinder 62 by lines 89 and 90. Line 89 supplies hydraulic fluid under pressure to the cylinder 62 for causing the piston 64 to be extended. Line 90 supplies hydraulic fluid under pressure to cylinder 62 to cause the piston 64 to be retracted. Valve assembly 84 also includes another manually operated valve 92 that is attached to a pilot check valve 94 by lines 95 and 96. Pilot check valve 94 is attached to cylinder 62' by lines 97 and 98. Line 97 delivers hydraulic fluid under pressure to cylinder 62' to cause piston 64' to be extended. Line 98 delivers hydraulic fluid under pressure to cylinder 62' to cause piston 64' to be retracted. Line 99 is a return line for returning hydraulic fluid to the mining machine's main hydraulic fluid tank. In addition, pilot check valves 86 and 94 are equipped with port connections 91 and 95, respectively, for attaching a manual hand pump (not shown) to control the operation of cylinders (62, 62'). Such hand pump arrangement enables the cylinders (62, 62') to be manually actuated in the case of a machine power failure or other problem that prevents the normal operation of the machine's hydraulic system.

Thus, by extending the piston 64 of cylinder 62, the intermediate duct assembly 40 will be pivoted to the second position wherein the intermediate duct assembly 40 is "displaced from" the mining machine frame 14. Similarly, by extending the piston 64' of cylinder 62', the intermediate duct assembly 40' will be pivoted to the second position wherein the intermediate duct assembly 40' is "displaced from" the mining machine frame 14. As used herein with respect to the position of the intermediate duct assembly (40, 40') or other displaceable duct assembly of other embodiments disclosed herein when in a second or maintenance position, "displaced from" refers to a position sufficiently spaced apart from the mining machine or support frame to which the duct assembly is attached to permit access to the portion or portions of the support frame or various other components attached thereto that are normally inaccessible when the displaceable duct assembly is in a first or filtering position.

In this embodiment, the exhaust fan (46, 46') is adapted to be fluidly interconnected to a corresponding discharge duct (70, 70') when the elongated forward duct (42, 42') is interconnected to the connection member (36, 36'). In particular, an extension duct (49, 49') is attached to the housing of the fan (46, 46') such that it will be arranged in confronting relationship with a corresponding connection duct (72, 72') attached to the discharge duct (70, 70') when the intermediate duct assembly (40, 40') is pivoted to the first position. An adjustable band clamp (74, 74'), such as the one manufactured by Joy Technologies, Inc. of Franklin, Pa., is preferably used to achieve a substantially hermetic seal between the ducts (49, 49') and (72, 72'). It will be appreciated that clamp (74, 74') can be loosened and displaced forward onto the duct (49, 49') or rearward onto duct (72, 72') when the intermediate duct assembly (40, 40') is disconnected from the discharge duct (70, 70'). Also, a support cradle (59, 59') is attached to the frame 14, preferably by welding, and is adapted to support the intermediate duct assembly (40, 40') on the mining machine 12 when the intermediate duct assembly (40, 40') is in the first position.

A filter member (100, 100') is also provided for filtering the contaminates from the contaminate-laden air as it is drawn through the continuous duct assembly (32, 32') by the exhaust fan (46, 46'). In this embodiment, for ease of installation and maintenance, the filter member (100, 100') is preferably mounted within the elongated forward duct (42, 42') of the intermediate duct assembly (40, 40') using known filter mounting techniques. See FIG. 1. The skilled artisan will appreciate, however, that the filter member (100, 100') or a plurality of filter members (100, 100') could conceivably be mounted in a variety of different positions that would enable it to filter the contaminate-laden air drawn into the continuous duct assembly (32, 32'). Accordingly, the scope of protection afforded to the subject invention should not be limited to embodiments wherein a single filter member (100, 100') is mounted within the intermediate duct assembly (40, 40').

Preferably, an access opening (102, 102') is provided in the elongated forward duct (42, 42') to enable the filter member (100, 100') to be easily removed for cleaning or replacement purposes. A door member (104, 104') is pivotally attached to the elongated forward duct (42, 42') in confronting relationship with the access opening (102, 102'). Sealing material may be attached around the perimeter of access opening (102, 102') or to the door (104, 104') to achieve a substantially airtight seal between the door (104, 104') and the elongated forward duct (42, 42'). A latch pin assembly (106, 106') is used to releasably lock the door (104, 104') in a closed position. The reader will appreciate that other door arrangements may also be successfully used depending upon where the filter member (100, 100') is mounted.

The above-described preferred embodiment of the present invention is operated as follows. When the intermediate duct assemblies (40, 40') are each in their respective first or filtering positions (FIG. 1), the elongated forward ducts (42, 42') are received in their corresponding connection members (36, 36'). In addition, the housings of fans (46, 46') are attached to corresponding discharge ducts (70, 70') in the above-described manner by corresponding clamp members (74, 74'). By selecting which fan member (46, 46') to be powered, the filtered air can be discharged on either side of the mining machine 12. If both fans (46, 46') are simultaneously powered, filtered air will be discharged on both sides of the mining machine 12. When it is desired to access the portion of the frame 14 or the various components attached thereto, which could comprise, for example, hydraulic hoses or other hydraulic components that are inaccessible when intermediate duct assembly 40 is in a first position, clamp 74 is loosened and displaced forward onto the duct 49 or rearward onto duct 72 to disconnect the intermediate duct assembly from the discharge duct 70. In addition, cover plate 39 is pivoted to a position overlying the discharge portion 35 of collection duct 30 and bolts 47 are loosened. Thereafter, valve 85 is manually actuated to simultaneously disable all other hydraulically powered components that are attached to the mining machine 12 and extend piston 64. By extending piston 64, the intermediate duct assembly is moved to the second position. To ensure that the intermediate duct assembly 40 remains in that position while the various components located thereunder are accessed, a support prop (110, 110'), preferably fabricated from steel angle or other suitable material, can be placed between the intermediate duct assembly (40, 40') and a portion of frame 14 to mechanically retain the intermediate duct assembly (40, 40') in that position. To retain the support prop (110, 110') in position, receptacle members (112, 112') are preferably welded to the frame 14 and elongated forward duct (42, 42'). See FIG. 6. After the necessary maintenance or repair activities have been performed, the prop (110, 110') is removed and preferably stored on the mining machine 12 for future use. Thereafter valve 85 is actuated to cause piston 64 to be retracted. After the intermediate duct assembly 40 has been returned to the first position by cylinder 62, the fan housing is connected to the discharge duct 70. Thereafter bolts 47 are re-tightened and cover plate 39 is pivoted to the position shown in FIG. 1. Valve 85 is then placed into a normal operating position to reactivate the normal machine hydraulics. The apparatus 10 is then ready to begin filtering contaminate-laden air when fan 46 is energized. It will be appreciated that the intermediate duct assembly 40' is operated in an identical manner.

Figure 9:
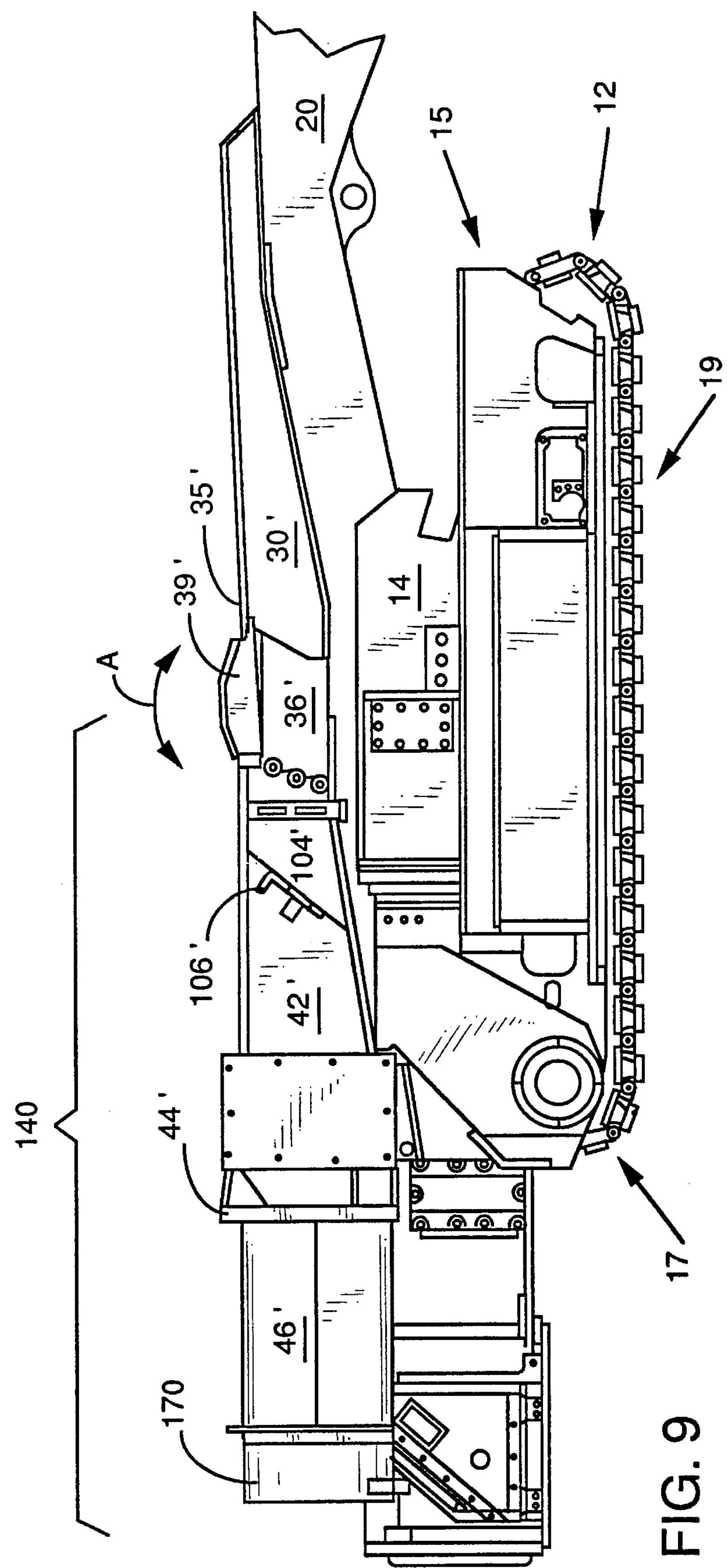
FIG. 9 is a side elevational view of another preferred embodiment of the displaceable filtering apparatus of the present invention in a first position attached to a mining machine.
Figure 10:
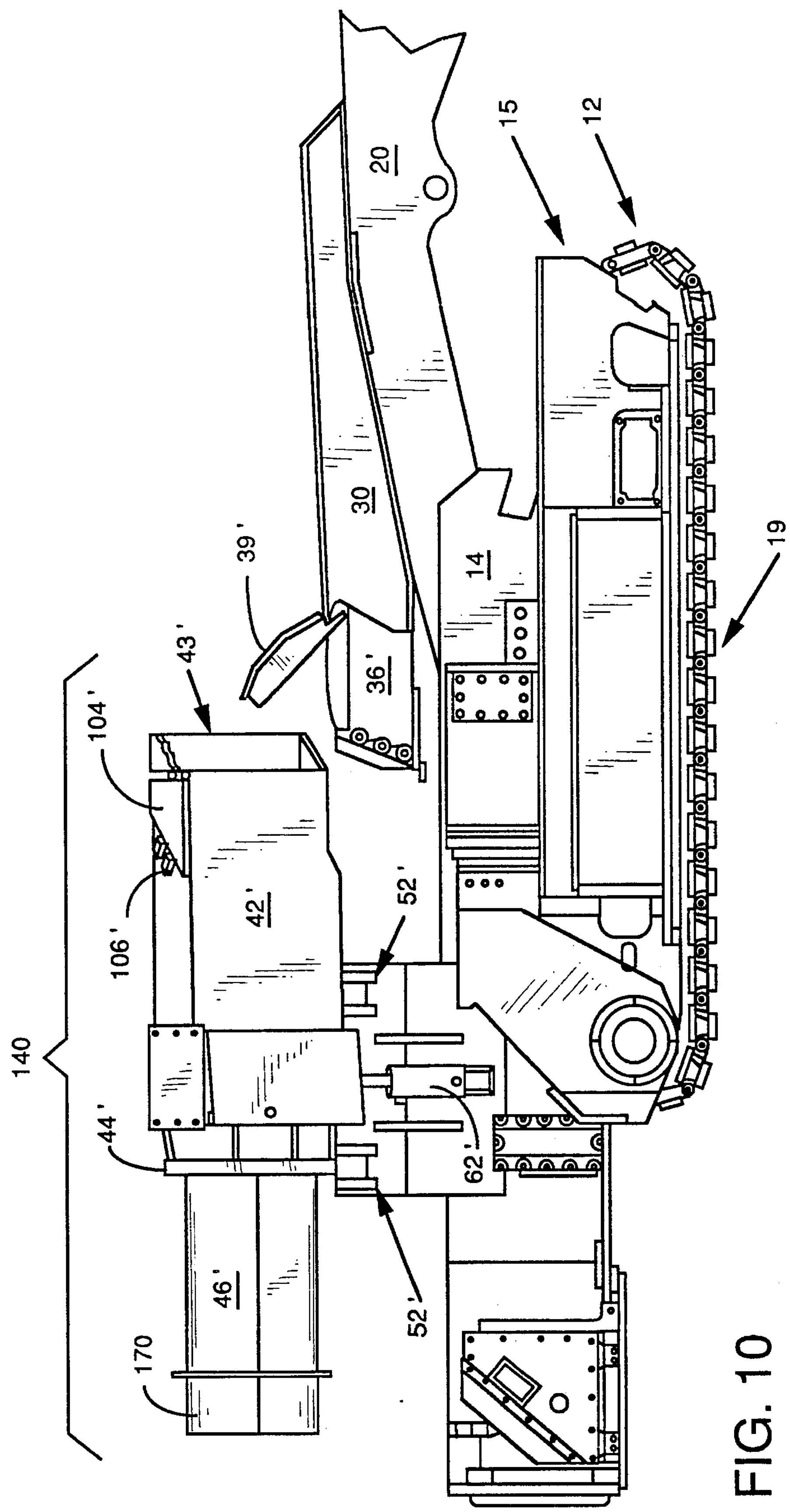
FIG. 10 is a side elevational view of the filtering apparatus of FIG. 9 pivoted to a second position.

Another embodiment is depicted in FIGS. 9 and 10. This embodiment is constructed and operated in the manner described above except that a discharge duct 170 is mounted to the housing of fan 46 for travel therewith. Thus, intermediate duct assembly 140 can be pivoted to the second position (FIG. 10) without having to first disconnect the fan housing from the discharge duct 170. Also, as with the embodiments described above, the mining machine 12 or other vehicle/apparatus having a support frame may only be provided with one apparatus 10 if so desired.

Accordingly, the present invention provides solutions to the aforementioned problems commonly encountered with mining machine ductwork. The skilled artisan will appreciate that the present invention provides quick and efficient access to components typically located under such heavy and cumbersome ductwork. It will be further appreciated that the various unique aspects of the present invention can be incorporated and successfully used in a variety of other filtering applications. It will therefore be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for filtering airborne contaminates, comprising:

frame means;

a collection duct attached to said frame means;

an elongated discharge duct assembly pivotally attached to said frame means, said discharge duct assembly being selectively pivotable about an axis parallel to its longitudinal axis between a first position wherein said discharge duct assembly is attachable at a first end thereof to said collection duct to create a continuous duct assembly and a second position wherein said discharge duct assembly is displaced from said frame means;

air flow inducing means operatively connected to said discharge duct assembly, said air flow inducing means selectively causing contaminate-laden air to be drawn into said continuous duct assembly and flow therethrough; and filter means operatively attached to said continuous duct assembly for filtering said contaminate-laden air drawn into said continuous duct assembly.

2. The apparatus of claim 1 wherein said filter means is mounted within said discharge duct assembly.

3. The apparatus of claim 1 further comprising means for selectively pivoting said discharge duct assembly between said first and second positions.

4. The apparatus of claim 3 wherein said means for selectively pivoting said discharge duct assembly comprises a cylinder attached to a mining machine, said cylinder having a selectively extendable and retractable piston attached to said discharge duct assembly.

5. The apparatus of claim 4 further comprising means for mechanically retaining said discharge duct assembly in said second position.

6. The apparatus of claim 2 further comprising means attached to said discharge duct assembly for selectively permitting access to said filter means.

7. The apparatus of claim 1 further comprising a discharge duct attached to said frame means; such that when said discharge duct assembly is in said first position the other end thereof is attachable to said discharge duct.

8. The apparatus of claim 7 wherein said filter means is mounted to said discharge duct assembly.

9. The apparatus of claim 7 wherein said air flow inducing means is mounted to said discharge duct assembly.

10. The apparatus of claim 7 further comprising means for selectively pivoting said discharge duct assembly between said first and second positions.

11. The apparatus of claim 10 wherein said means for selectively pivoting said discharge duct assembly comprises a cylinder attached to said frame, said cylinder having a selectively extendable and retractable piston attached to said intermediate duct.

12. The apparatus of claim 11 further comprising means for mechanically retaining said discharge duct assembly in said second position.

13. The apparatus of claim 8 further comprising means attached to said collection duct for selectively permitting access to said filter means.

14. Apparatus for collecting airborne contaminates generated by a mining head of a mining machine, comprising:

a collection duct attached to the mining machine adjacent the mining head;

an elongated discharge duct assembly pivotally attached to a frame of said mining machine, said discharge duct assembly being selectively pivotable about an axis parallel to its longitudinal axis between a first position wherein said discharge duct assembly is attachable to said collection duct to create a continuous duct assembly and a second position wherein said discharge duct assembly is displaced from said frame of said mining machine to permit access thereto;

air flow inducing means operatively connected to said discharge duct assembly, said air flow inducing means selectively causing contaminate-laden air to be drawn into said continuous duct assembly and pass therethrough; and filter means operatively attached to said continuous duct assembly for filtering said contaminate-laden air drawn into said continuous duct assembly.

15. The apparatus of claim 14 wherein said filter means is mounted within said discharge duct assembly.

16. The apparatus of claim 14 further comprising means for selectively pivoting said discharge duct assembly between said first and second positions.

17. The apparatus of claim 16 wherein said means for selectively pivoting said discharge duct assembly comprises a cylinder attached to the mining machine, said cylinder having a selectively extendable and retractable piston attached to said discharge duct assembly.

18. The apparatus of claim 16 further comprising means for mechanically retaining said discharge duct assembly in said second position.

19. The apparatus of claim 15 further comprising means attached to said collection duct for selectively permitting access to said filter means.

20. The apparatus of claim 14 further comprising a discharge duct attached to the mining machine such that when said discharge duct assembly is in said first position the other end thereof is attachable to said discharge duct.

21. The apparatus of claim 20 wherein said filter means is mounted within said discharge duct assembly.

22. The apparatus of claim 20 wherein said air flow inducing means is mounted within said discharge duct assembly.

23. The apparatus of claim 20 further comprising means for selectively pivoting said discharge duct assembly between said first and second positions.

24. The apparatus of claim 23 wherein said means for selectively pivoting said discharge duct assembly comprises a cylinder attached to the mining machine, said cylinder having a selectively extendable and retractable piston attached to said discharge duct assembly.

25. The apparatus of claim 23 further comprising means for retaining said discharge duct assembly in said second position.

26. The apparatus of claim 22 further comprising means attached to said collection duct for selectively permitting access to said filter means.

27. The apparatus of claim 20 wherein said elongated discharge duct assembly is attached to a first lateral side of said mining machine and wherein said apparatus further comprises.

another discharge duct attached to the mining machine;

another discharge duct assembly pivotably attached to a second lateral side of said mining machine and being selectively pivotable between a primary position wherein said another discharge duct assembly is interposed between said collection duct and said another discharge duct such that another said discharge duct assembly can be detachably serially interconnected to said collection duct and said another discharge duct to create another duct assembly and a secondary position wherein said another discharge duct assembly is displaced from said frame;

another filter means operatively attached to said another duct assembly; and another air flow inducing means operatively communicating with said another duct assembly to selectively cause dust-laden air to be drawn into said another duct assembly.

28. The apparatus of claim 27 wherein said another filter means is mounted in said another discharge duct assembly.

29. The apparatus of claim 27 wherein said another air flow inducing means is mounted in said another discharge duct assembly.

30. The apparatus of claim 27 further comprising:

means for selectively pivoting said discharge duct assembly between said first and said second positions; and means for selectively pivoting said another discharge duct assembly between said primary and secondary positions.

31. The apparatus of claim 30 wherein said means for selectively pivoting said discharge duct assembly comprises a first cylinder attached to the mining machine, said first cylinder having a selectively extendable and retractable first piston attached to said first intermediate duct and wherein said means for selectively pivoting said another discharge duct assembly comprises a second cylinder attached to the mining machine, said second cylinder having a selectively extendable and retractable second piston attached to said another discharge duct assembly.

32. The apparatus of claim 30 further comprising:

first means for mechanically retaining said discharge duct assembly in said second position; and second means for mechanically retaining said another discharge duct assembly in said secondary position.

33. The apparatus of claim 28 further comprising first means attached to said discharge duct assembly for selectively permitting access to said filter means therein and second means attached to said another discharge duct assembly to permit access to said another filter means therein.

* * * * *

UNITED STATES PATENT AND TRADEMARK OFFICE

CERTIFICATE OF CORRECTION

PATENT NO. : 5,597,393

DATED : January 28, 1997

INVENTOR(S) : Randall F. Johnson and Christopher G. Stewart

It is certified that error appears in the above-indentified patent and that said Letters Patent is hereby corrected as shown below:

Col. 10, line 37, delete "intermediate duct" and insert therefor --discharge duct assembly--.

Col. 11, line 45, delete "pivotably" and insert therefor --pivotally--.

Col. 12, line 2, delete "another said" and insert therefor --said another--.

Col. 12, line 21, after "said", insert therefor --another--.

Col. 12, line 30, delete "first intermediate duct" and insert therefor --discharge duct assembly--.

Signed and Sealed this

Third Day of June, 1997

Attest:

BRUCE LEHMAN

*Attesting Officer*

*Commissioner of Patents and Trademarks*